US006993961B2

(12) United States Patent  
Wieser

(10) Patent No.: US 6,993,961 B2  
(45) Date of Patent: Feb. 7, 2006

(54) ROAD TEST SIMULATOR AND METHOD FOR SYNCHRONIZING CONTROL OF THE ROAD TEST SIMULATOR

(75) Inventor: Norbert Wieser, Graefenberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/618,769

(22) Filed: Jul. 15, 2003

(65) Prior Publication Data

US 2004/0083802 A1 May 6, 2004

Related U.S. Application Data

(63) Continuation of application No. PCT/DE02/00026, filed on Jan. 8, 2002.

(30) Foreign Application Priority Data

Jan. 15, 2001 (DE) ............................ 101 01 582

(51) Int. Cl.  
*G01M 17/02* (2006.01)

(52) U.S. Cl. ........................................ 73/146; 73/117

(58) Field of Classification Search ................ 73/147, 73/117, 146  
See application file for complete search history.

(56) References Cited

U.S. PATENT DOCUMENTS

| 2,682,630 A | | 6/1954 | Keller |
| 4,161,116 A | | 7/1979 | Fegraus et al. |
| 4,538,097 A | | 8/1985 | Tourneur |
| 4,635,472 A | | 1/1987 | Scourtes |
| 5,375,461 A | * | 12/1994 | Suzuki ........................ 73/117 |
| 5,402,676 A | | 4/1995 | Shibayama et al. |
| 5,542,290 A | * | 8/1996 | Suzuki ........................ 73/117 |
| 2004/0050150 A1 | * | 3/2004 | Jahn et al. ................... 73/146 |

FOREIGN PATENT DOCUMENTS

| DE | 23 37 011 A | 2/1975 |
| DE | 42 38 968 C1 | 1/1994 |
| DE | 299 18 490 U1 | 1/2001 |
| EP | 0 567 781 A | 11/1993 |

* cited by examiner

*Primary Examiner*—Max Noori  
*Assistant Examiner*—Andre Allen  
(74) *Attorney, Agent, or Firm*—Sughrue Mion, PLLC

(57) ABSTRACT

A method for synchronizing control of a road test simulator and a road test simulator having four rollers (10, 20, 30, 40) and four asynchronous motors (12, 22, 32, 42). Each of the asynchronous motors is used to actuate one of the rollers. Each roller is associated with a speed/angle rotation. The synchronization control takes place electronically and in the manner of a ring structure.

17 Claims, 3 Drawing Sheets

10, 20, 30, 40 Rollers  
12, 22, 32, 42 Motors  
16, 26, 36, 46 Inverters  
17, 27, 37, 47 Gearing  
18, 28, 38, 48 Controllers  
50 High-Level Control

ROAD TEST SIMULATOR AND METHOD FOR SYNCHRONIZING CONTROL OF THE ROAD TEST SIMULATOR

This is a Continuation of International Application PCT/DE02/00026, with an international filing date of Jan. 8, 2002, which was published under PCT Article 21(2) in German, and the disclosure of which is incorporated into this application by reference.

FIELD OF AND BACKGROUND OF THE INVENTION

The invention relates to a road test simulator and to a method for synchronizing control of a road test simulator.

In order to inspect a vehicle after its final assembly, various tests are ordinarily conducted. These tests are often carried out as actual road tests, which renders the testing costly.

So as to abbreviate or to completely replace such costly road tests, it is known in the art to provide a road test simulator, which can be used to simulate the irregularities of a road surface. Most prior-art simulators, however, have rollers with a non-adjustable profile. As a result they are inflexible and thus suitable only for limited testing of a vehicle.

German reference DE 299 18 490.0 describes a road test simulator with profiled rollers. Each of these rollers is provided with a plurality of profile-imparting blocks along its outer circumference. These blocks can be adjusted in the radial direction of the roller to change the profile of the roller. Each roller ranges in width from a single to a double width of the vehicle tire. The road test simulator is additionally provided with a computer unit to implement a test program. With the aid of this test program, the computer unit can be programmed, for example, to simulate different road surfaces automatically by adjusting the blocks of the rollers.

Also, U.S. Pat. No. 4,635,472 discloses an apparatus for testing a vehicle. Each vehicle of the vehicle to be tested has a corresponding own rotary drum. Every rotary drum is driven by a separate synchronous electric motor. The motors are coupled via a common frequency control unit to an electric power source. To ensure that the synchronous motors have the same rotational speed, changes in torque are detected by torque measurement devices respectively coupled to each motor. The measured values of the torque measurement devices are supplied to a central evaluation device, which derives an adjustment signal for the central frequency control unit.

European Patent Application 0 567 781 discloses a method and an apparatus for controlling electric motors. Two or more motors with defined differences in rotational speed are to be driven. This is accomplished using sensors to generate pulse trains in response to increasing swing angles of the motors. The motors are then temporarily either partly or completely disconnected from the power supply on the basis of the differences in the pulse trains.

In addition, it is conventional in the art to ensure that the rollers of a road test simulator are synchronized, through the use of a mechanical coupling of the rollers.

OBJECTS OF THE INVENTION

One object of the invention is to provide a new method for the synchronization control of a road test simulator, e.g., in order to increase the flexibility thereof.

SUMMARY OF THE INVENTION

According to one formulation of the invention, this object is attained by a road test simulator that includes four rollers and four asynchronous motors, wherein each of the asynchronous motors drives a respective one of the rollers, four control units, wherein each of the rollers is assigned to a respective one of the control units, and a synchronization control. The synchronization control is effected electronically in accordance with a ring structure such that a given one of the control units assigned to a given one of the rollers receives a synchronization pulse and an actual speed value for the given control unit and receives a further synchronization pulse and a further actual speed value for a further one of the control units assigned to a preceding one of the rollers.

According to another formulation, the invention is directed to a method that includes assigning a master function to a first of four rollers of a road test simulator, defining a speed setpoint for control of the roller acting as the master, detecting an actual speed value of the roller acting as the master, defining the detected actual speed value of the roller acting as the master as a speed setpoint for controlling a second of the four rollers, detecting an actual speed value of the second roller, and controlling the speed of the second roller to match the actual speed value of the second roller to the speed setpoint.

Advantageous embodiments and further developments of the invention are described herein below.

One advantage stemming from the invention is, in particular, the ability to provide a specific torque for the driving gear of the vehicle during testing, to simulate, thereby, uphill or downhill driving. It is further possible to change the positioning of the profiled rollers in relation to each other, and thereby to change the sequence of the simulated road surfaces in vibration tests. By using suitable control releases, test routines can be implemented simply and quickly for front, rear and all wheel drive vehicles.

BRIEF DESCRIPTION OF THE DRAWINGS

Further advantageous features of the invention will now be described by way of example with reference to the figures in which.

DETAILED DESCRIPTION OF THE PREFERRED EMBODIMENTS

A road test simulator according to the embodiment of the invention described here can be operated in two operating modes: operating mode 1: "roller drives vehicle" and operating mode 2: "vehicle drives roller."

In the operating mode 1, "roller drives vehicle," a rotational speed setpoint is defined by means of a higher-level control via, e.g., a control panel. This speed setpoint is used to control asynchronous motors, which in turn drive rollers on which the wheels of the vehicle are positioned. The road test simulator control ensures that all four rollers are operated in angular synchronization, taking into account, if circumstances warrant, a predefinable relative position of the rollers in relation to each other. In this operating mode, the brakes of the vehicle are not applied and the clutch is disengaged.

In the operating mode 2, "vehicle drives roller," a driver of the vehicle indirectly defines the rotational setpoint speed by actuating the gas pedal of the vehicle. If the clutch of the vehicle is engaged, actuating the gas pedal causes the two wheels driving the vehicle to rotate and a corresponding force to be transmitted to the rollers. In this case, too, the road test simulator control ensures an angular synchronization of all the rollers, taking into account, if appropriate, a predefinable offset angle.

Figure 1:
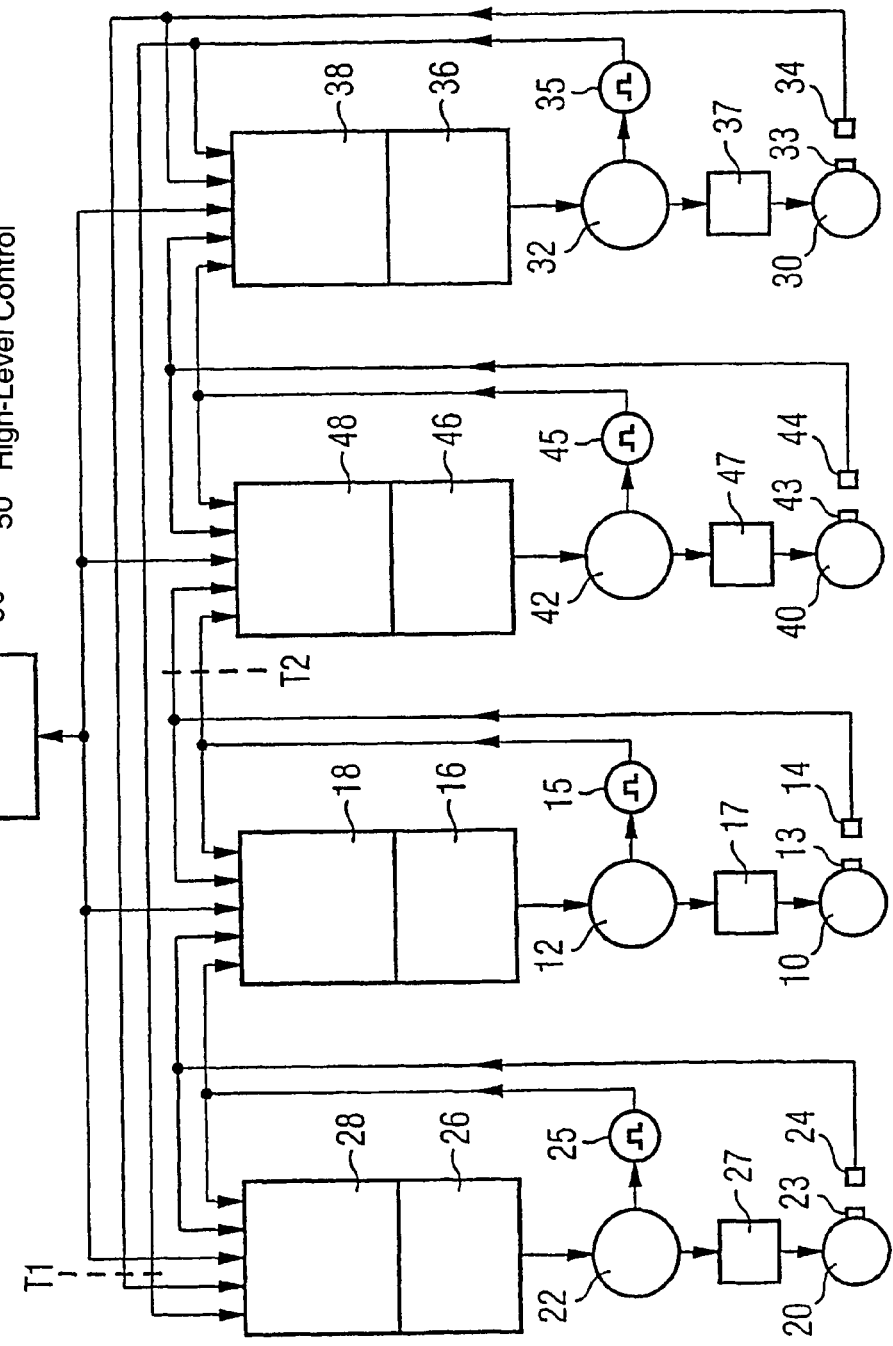
FIG. 1 is a block diagram illustrating the interaction of individual components of a road test simulator according to an embodiment of the invention.

FIG. 1 shows a block diagram illustrating the interaction of the individual components of a road test simulator according to the described embodiment of the invention.

The road test simulator depicted has four rollers 10, 20, 30, 40. During the testing operation, the left front wheel of the motor vehicle is positioned on the roller 20. The roller 20 is connected with an asynchronous motor 22 with interposed gearing 27. This asynchronous motor is controlled by an inverter 26 with integrated speed/angle control 28. The asynchronous motor 22 is equipped with a digital tachometer 25 that emits a plurality of pulses, e.g. 1024, with each revolution of the motor. The output signal of the digital tachometer 25 is supplied to the speed control as an actual speed value. The roller 20 has a synchronization marker 23. When this synchronization marker passes a sensor 24 during one rotation of the roller, this sensor supplies a synchronization pulse to the speed/angle control 28. Thus, the speed/angle control knows the absolute position of the roller relative to the sensor 24.

In addition, the speed/angle control 28 also receives a synchronization pulse of the sensor 34 and the pulses generated by a digital tachometer 35.

During the testing operation, the right front wheel of the vehicle is positioned on the roller 10. The roller 10 is connected with an asynchronous motor 12 with interposed gearing 17. This asynchronous motor is controlled by an inverter 16 with integrated speed/angle control 18. The asynchronous motor 12 is equipped with a digital tachometer 15 that emits a plurality of pulses, e.g. 1024, with each revolution of the motor. The output signal of the digital tachometer 15 is supplied to the speed control as an actual speed value. The roller 10 has a synchronization marker 13. When this synchronization marker passes a sensor 14 during one rotation of the roller, this sensor supplies a synchronization pulse to the speed/angle control 18. Thus, the speed/angle control knows the absolute position of the roller relative to the sensor 14. The speed/angle control 18 further receives the synchronization pulse of the sensor 24 and the pulses generated by the digital tachometer 25.

During the testing operation, the right rear wheel of the motor vehicle is positioned on the roller 40. The roller 40 is connected with an asynchronous motor 42 with interposed gearing 47. This asynchronous motor is controlled by an inverter 46 with integrated speed/angle control 48. The asynchronous motor 42 is equipped with a digital tachometer 45 that emits a plurality of pulses, e.g. 1024, with each revolution of the motor. The output signal of the digital tachometer 45 is supplied to the speed control as an actual speed value. The roller 40 has a synchronization marker 43. When this synchronization marker passes a sensor 44 during one rotation of the roller, this sensor supplies a synchronization pulse to the speed/angle control 48. The speed/angle control 48 further receives the synchronization pulse of the sensor 14 and the pulses generated by the digital tachometer 15.

During the testing operation, the left rear wheel of the motor vehicle is positioned on the roller 30. The roller 30 is connected with an asynchronous motor 32 with interposed gearing 37. This asynchronous motor is controlled by an inverter 36 with integrated speed/angle control 38. The asynchronous motor 32 is equipped with a digital tachometer 35 that emits a plurality of pulses, e.g. 1024, with each revolution of the motor. The output signal of the digital tachometer 35 is supplied to the speed control as an actual speed value. The roller 30 has a synchronization marker 33. When this synchronization marker passes a sensor 34 during one rotation of the roller, this sensor supplies a synchronization pulse to the speed/angle control 38. The speed/angle control 38 further receives the synchronization pulse of the sensor 44 and the pulses generated by the digital tachometer 45.

The road test simulator depicted in FIG. 1 makes it possible to test front, rear and all wheel drive vehicles. During operation of the simulator, one of the rollers is assigned a master function while the other rollers are slaves. For vehicles with front wheel drive, for example, the left front roller 20 is assigned a master function. For vehicles with rear-wheel drive, for example, the right rear roller 40 is assigned a master function. For vehicles with all wheel drive, for example, the left front roller 20 or the left rear roller 30 can be assigned a master function.

If the depicted road test simulator is to be used in the operating mode 1, "roller drives vehicle," to test vehicles with front wheel drive, the left front roller 20 is assigned a master function—as described above. In this operating mode, a higher-level control 50 predefines a rotational speed set point for the speed/angle control 28. The speed/angle control 28 controls the inverter 26 as a function of the speed set point in such a way that the inverter suitably controls the asynchronous motor 22 as a function of the speed setpoint and the respectively required motor torque. The asynchronous motor, in turn, drives the roller 20 via the gearing 27, so that the roller rotates at a speed that is a function of the speed setpoint.

In this operating mode, in which the roller 20 is assigned a master function, the ring structure of the control shown in FIG. 1 is interrupted at the point indicated by the dashed line T1 because control with respect to the master is limited to the setpoint speed predefined by the higher-level control 50. Fine-tuning or angular control as a function of the pulses derived from the digital tachometer 35 and the sensor 34 is omitted.

In contrast, if the road test simulator depicted is to be used to test vehicles with rear wheel drive, the right rear roller 40 is assigned a master function—as described above. In this operating mode, a speed set point is predefined for the speed/angle control 48 by the higher-level control 50. The speed/angle control 48 controls the inverter 46 as a function of the speed setpoint in such a way that the inverter controls the asynchronous motor 42 as a function of the speed setpoint. The asynchronous motor, in turn, drives the roller 40 via the gearing 47, so that the roller rotates at a speed that is a function of the speed setpoint.

In this operating mode, in which the roller 40 is assigned a master function, the ring structure of the control shown in FIG. 1 is interrupted at the point indicated by the dashed line T2 because control with respect to the master is limited to the setpoint speed predefined by the higher-level control 50. Fine-tuning or angular control as a function of the pulses derived from the digital tachometer 15 and the sensor 14 is omitted.

Figure 2:
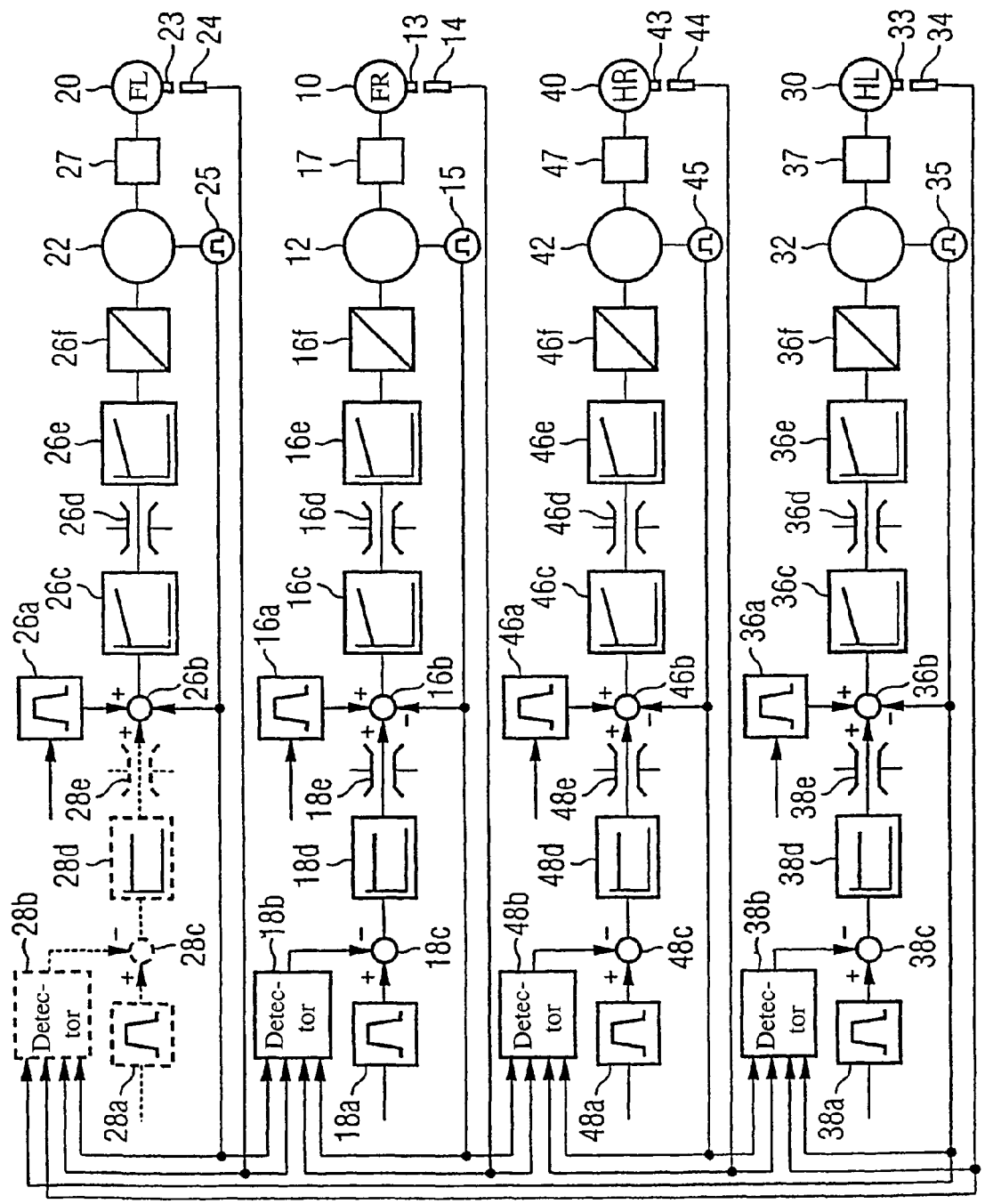
FIG. 2 is a detailed structure diagram of the control in one possible operating mode of a road test simulator embodying the invention.

FIG. 2 is a detailed structure diagram of the control in an operating mode in which vehicles with front wheel drive are tested. The vehicle to be tested is positioned on the rollers 10, 20, 30, 40 without brakes applied and with clutch disengaged, i.e. in the operating mode 1, "roller drives vehicle." In this operating mode, the front left roller 20 is assigned a master function. The other rollers 10, 30 and 40 are matched to the roller 20 utilizing an electronic synchronization control. In the embodiment shown, the front right wheel is positioned on the roller 10, the front left wheel is positioned on the roller 20, the hind left wheel is positioned on the roller 30, and the hind right wheel is positioned on the roller 40.

FIG. 2 shows that each roller 10, 20, 30, 40 is assigned its own control loop with asynchronous motor 12, 22, 32, 42 driving the corresponding roller via gearing 17, 27, 37, 47.

The control loop assigned to the roller 20 has a ramp function generator 28a, an actual speed/position detector 28b, an adder 28c, a displacement/angle controller 28d and a limiter 28e. The control loop associated with the roller 20 further has a ramp function generator 26a, an adder 26b, a rotational speed controller 26c, a limiter 26d, a current controller 26e and a firing unit 26f.

The control loop assigned to the roller 10 has a ramp function generator 18a, an actual speed/position detector 18b, an adder 18c, a displacement/angle controller 18d and a limiter 18e. The ramp function generator associated with the roller 10 further has a ramp function generator 16a, an adder 16b, a rotational speed controller 16c, a limiter 16d, a current controller 16e and a firing unit 16f.

The control loop assigned to the roller 40 has a ramp function generator 48a, an actual speed/position detector 48b, an adder 48c, a displacement/angle controller 48d and a limiter 48e. The ramp function generator associated with the roller 40 further has a ramp function generator 46a, an adder 46b, a rotational speed controller 46c, a limiter 46d, a current controller 46e and a firing unit 46f.

The control loop assigned to the roller 30 has a ramp function generator 38a, an actual speed/position detector 38b, an adder 38c, a displacement/angle controller 38d and a limiter 38e. The ramp function generator associated with the roller 30 further has a ramp function generator 36a, an adder 36b, a rotational speed controller 36c, a limiter 36d, a current controller 36e and a firing unit 36f.

The elements 28a, 28b, 28c, 28d and 28e of the control loop assigned to the roller 20 are shown as a dashed line in FIG. 2 because they are disabled in the current operating mode, as is indicated by the dashed line T1 in FIG. 1.

A rotational speed setpoint is supplied to the input of the ramp function generator 26a by way of a higher-level control, e.g. via a control panel. The purpose of the ramp function generator is to ensure that the speed setpoint of the downstream circuit is supplied in accordance with a ramp. This has the effect that the full speed setpoint is present only after a preset time interval has elapsed.

The output signal of the ramp function generator 26a is supplied to the adder 26b, which receives the actual speed value with negative sign from the asynchronous motor 22 derived from the tacho pulses of the digital tachometer 25. The output signal of the adder 26b reaches the speed controller 26c. The speed controller's output signal is fed via the limiter 26d to the current controller 26e, whose output in turn is connected with the firing unit 26f. The firing unit converts the signal into electrical pulses, which are used to suitably control the semiconductor valves of the inverter 26. The asynchronous motor 22 drives the front left roller 20 via the gearing 27. The motor voltage or motor current arising in the asynchronous motor then corresponds to the desired motor speed and the desired motor torque.

The actual speed value of the master derived from the asynchronous motor 22 is supplied as a rough speed setpoint via the higher-level control 50 to the input of the ramp function generator 16a of the control loop associated with the roller 10. Through the ramp function generator 16a, this actual speed value reaches the adder 16b. The adder further receives a speed correction value and, with a negative sign, the actual speed value derived from the digital tachometer 15.

The speed correction value supplied to the adder 16b is determined using an offset setpoint of the pulses derived from the digital tachometer 25 of the master, the digital tachometer 15, the sensor 24 of the master and the sensor 14 of the roller 10. The offset setpoint is predefined by the higher-level control 50 and supplied to the adder 18c via the ramp function generator 18a. The pulses derived from the digital tachometers 25 and 15 and from the sensors 24 and 14 are used to determine a position deviation signal in the speed/position detector 18b. This signal is supplied to the adder 18c with a negative sign.

The output signal of the adder 18c is supplied to the displacement/angle controller 18d. The output signal of the displacement/angle controller reaches the adder 16b via the limiter 18e and influences the downstream speed control in the manner of a fine correction.

The output signal of the adder 16b reaches the speed controller 16c. The output signal of the speed controller is supplied to the current controller 16e via the limiter 16d. In the firing unit downstream of the current controller, the signal is converted into electrical pulses, which are used to control the asynchronous motor 12 via semiconductor valves (IGBTs). The asynchronous motor 12 drives the front right roller 10 via the gearing 17.

The actual speed value of the master derived from the asynchronous motor 22 is supplied as a rough speed setpoint via the higher-level control 50 to the input of the ramp function generator 46a of the control loop assigned to the roller 40. Through the ramp function generator 46a, this actual speed value reaches the adder 46b. The adder further receives a speed correction value and, with a negative sign, the actual speed value derived from the pulse generator 45.

The speed correction value supplied to the adder 46b is determined using an offset setpoint of the pulses derived from the digital tachometer 15 of the asynchronous motor 12, the digital tachometer 45, the sensor 14 of the roller 10 and the sensor 44 of the roller 40. The offset setpoint is predefined by the higher-level control 50 and supplied to the adder 48c via the ramp function generator 48a. The pulses derived from the digital tachometers 15 and 45 and from the sensors 14 and 44 are used to determine a position deviation signal in the actual speed/position value detector 48b. This signal is supplied to the adder 48c with a negative sign.

The output signal of the adder 48c is supplied to the displacement/angle controller 48d. The output signal of the displacement/angle controller reaches the adder 46b via the limiter 48e and influences the downstream speed control in terms of a fine correction.

The output signal of the adder 46b reaches the speed controller 46c. The output signal of the speed controller is supplied to the current controller 46e via the limiter 46d. In the firing unit downstream of the current controller, the signal is converted into electrical pulses, which are used to control the asynchronous motor 42 via semiconductor valves (IGBTs). The asynchronous motor 42 drives the rear right roller 40 via the gearing 47.

The actual speed value of the motor derived from the asynchronous motor 22 is supplied as a rough speed setpoint via the higher-level control 50 also to the input of the ramp function generator 36a of the control loop assigned to the roller 30. Through the ramp function generator 36a, this actual speed value reaches the adder 36b. The adder further receives a speed correction value and, with a negative sign, the actual speed value derived from the pulse generator 35.

The speed correction value supplied to the adder 36b is determined using an offset setpoint of the pulses derived from the digital tachometer 45 of the asynchronous motor 42, the digital tachometer 35, the sensor 44 of the roller 40 and the sensor 34 of the roller 30. The offset setpoint is predefined by the higher-level control 50 and supplied to the adder 38c via the ramp function generator 38a. The pulses derived from the digital tachometers 45 and 35 and from the sensors 44 and 34 are used to determine a position deviation signal in the actual speed/position value detector 38b, which is supplied to the adder 38c with a negative sign.

The output signal of the adder 38c is supplied to the displacement/angle controller 38d. The output signal of the displacement/angle controller reaches the adder 36b via the limiter 38e and influences the downstream speed control as a fine correction.

The output signal of the adder 36b reaches the speed controller 36c. The output signal of the speed controller is supplied to the current controller 36e via the limiter 36d. In the firing unit downstream of the current controller, the signal is converted into electrical pulses, which are used to control the asynchronous motor 32 via semiconductor valves (IGBTs). The a synchronous motor 32 drives the rear left roller 30 via the gearing 37.

Using the control structure shown in FIG. 2, the slave rollers 10, 30 and 40 are operated in angular synchronization relative to the roller 20, which acts as the master. A speed setpoint is predefined for the control loop of the roller 20 by a higher-level control. The actual speed value of the asynchronous motor 22 assigned to the roller 20 is detected and supplied as a rough speed setpoint to the speed/angle controllers associated with the rollers 10, 30 and 40 via the higher-level control 50.

In the embodiment shown, the ring structure of the control is interrupted by disabling the displacement/angle controller 28d, which in FIG. 2 is indicated by the dashed lines. This disabling can be effected, for example, by inhibiting the angle controller.

Using the limiters 16d, 26d, 36d and 46d the output signal of the respective speed controller 16c, 26c, 36c and 46c can be limited to prevent overload of the corresponding asynchronous motor 12, 22, 32, 42.

Using the limiters 18e, 38e and 48e, the additional setpoint that is present at the output of the respective displacement/angle controller 18d, 38d and 48d can be limited to a predefined maximum value. This makes it possible to adjust the rate of the offset angle adjustment.

Figure 3:
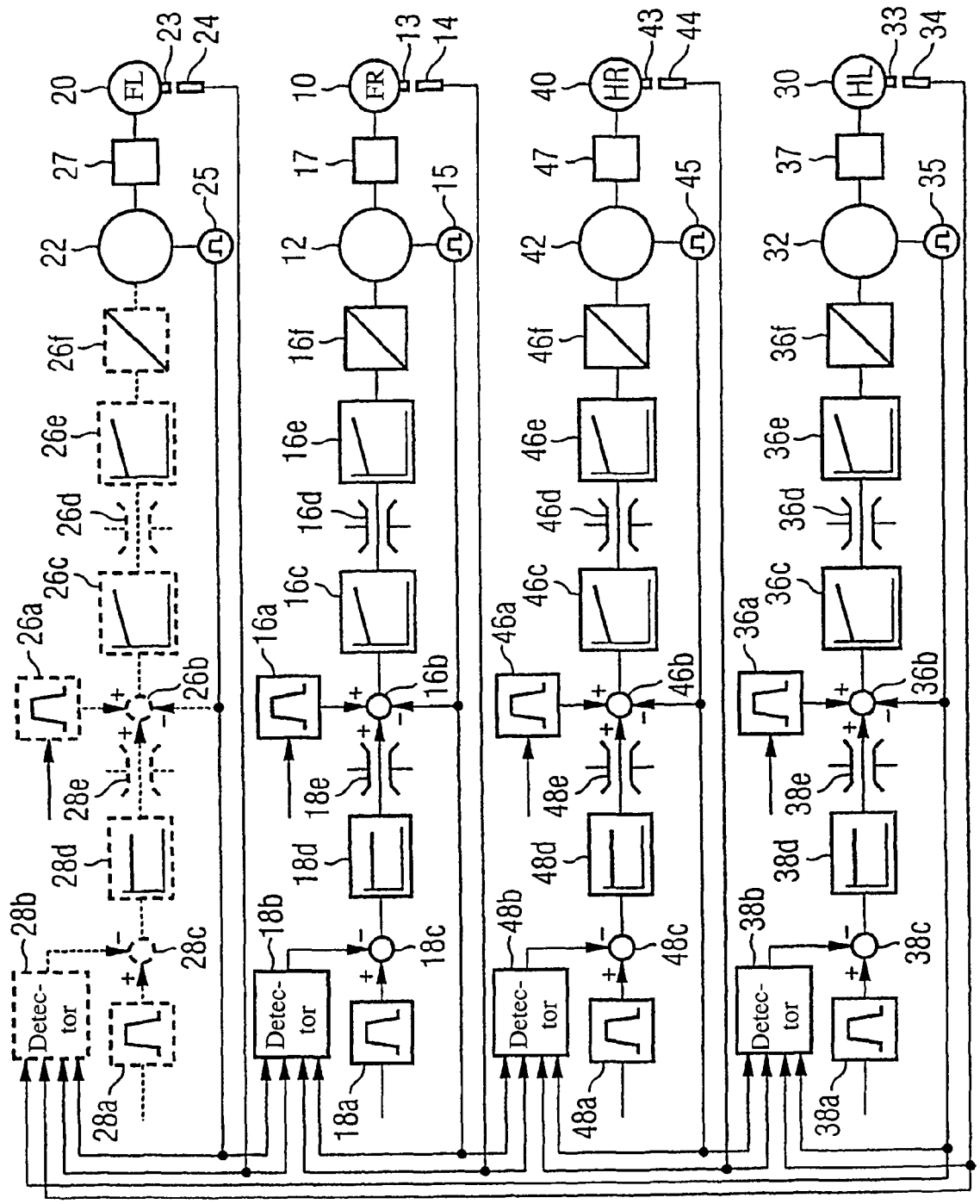
FIG. 3 is a detailed structure diagram of the control in another possible operating mode of the road test simulator.

FIG. 3 shows a detailed structure diagram of the control in operating mode 2, "vehicle drives roller," for a vehicle with front wheel drive. Accordingly, the front left roller 20 is assigned a master function in FIG. 3 as well. The other rollers 10, 30 and 40 are matched to the roller 20 using the electronic synchronization control.

The structure diagram of FIG. 3 is distinguished from that shown in FIG. 2 in that, in FIG. 3, a rotational speed setpoint of zero is predefined for the speed control loop with the components 26a, 26b, 26c, 26d, 26e and 26f and no motor torque at all is permitted (torque limit equals zero). This is indicated by the dashed lines in FIG. 3.

The setpoint speed in this operating mode is defined by the driver of the test vehicle through a corresponding actuation of the gas pedal. The corresponding actual speed of the roller 20, or the motor 22 assigned thereto, is measured and supplied as the speed setpoint to the control loop associated with the roller 10. The synchronization control is, in other respects, effected in the same manner as described above with reference to FIG. 2.

The above-described control processes may require not only the angular synchronism (synchronism of all four wheels) but also synchronization (reproducibility of the road surface) and an offset angle adjustment (change of the road surface). In such an event, the synchronization pulses or zero pulses derived from the respective sensor 14, 24, 34, 44 and identifying a specific positioning on the roller must also be analyzed. In this synchronization process, the synchronous pulses of the respective master and the respective slave must be brought into a certain position relative to one another. The angular offset between the two synchronization markers is characterized by the number of the incoming tacho pulses of the respective slave drive between the two synchronization markers.

If vehicles with rear wheel drive are tested in the same operating mode 2, the rear right roller 40 is assigned a master function. To implement this operating mode, the control loop is interrupted, in analogous manner, by an omitted angle controller release to 48d. The speed setpoint zero is predefined for the speed controller 46c. The torque limit 46d is set to zero.

By predefining torque limits unequal to zero in operating mode 2, "vehicle drives roller," it is possible to specifically apply torques to the motor and, via the gearing, to the roller during the operation of the vehicle because the speed controller is overridden (speed setpoint equal to zero, actual speed value unequal to zero). These torques can simulate uphill or downhill driving depending on the torque direction.

Thus, a road test simulator according to the invention can be operated in many different operating modes. A transition between the possible operating modes can be simply and quickly effected by an electronic definition of parameters.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. Road test simulator comprising:
   four rollers and four asynchronous motors, wherein each of the asynchronous motors drives a respective one of the rollers,
   four control units, wherein each of the rollers is assigned to a respective one of the control units, and
   a synchronization control, which is effected electronically in accordance with a ring structure such that a given one of the control units assigned to a given one of the rollers receives a synchronization pulse and an actual speed value for the given control unit and receives a further synchronization pulse and a further actual speed value for a further one of the control units assigned to a preceding one of the rollers.

2. Road test simulator as claimed in claim 1, wherein the synchronization control is configured to interrupt the ring structure as a function of predefined parameters, in accordance with a drive type with which vehicles to be tested are equipped.

3. Road test simulator as claimed in claim 1, wherein at least one of the control units generates a torque to simulate uphill or downhill driving.

4. Road test simulator as claimed in claim 1, wherein the rollers are configured to be displaced relative to one another, and wherein the synchronization control is configured to produce and maintain a given relative displacement.

5. Road test simulator as claimed in claim 1, further comprising:
   detectors detecting an actual speed value of a first of the rollers and an actual speed value of a second of the rollers, and
   an input providing a speed setpoint for at least one of speed and angle control of the first roller,
   wherein the synchronization control assigns a master function to the first roller, the detected actual speed value of the roller acting as the master is defined as a speed setpoint for at least one of speed and angle control of the second roller, and the synchronization control controls the speed of the second roller such that the actual speed value of the second roller matches the speed setpoint.

6. Road test simulator as claimed in claim 5, wherein the speed setpoint of the roller acting as the master is defined by a higher-level control of the synchronization control.

7. Road test simulator as claimed in claim 5, wherein the speed setpoint of the roller acting as the master is defined by a vehicle speed of a vehicle to be tested from actuating a gas pedal of the vehicle.

8. Road test simulator as claimed in claim 5, further comprising:
   a detector detecting an actual speed value of a third of the rollers,
   wherein the detected actual speed value of the roller acting as the master is defined as a speed setpoint for at least one of speed and angle control of the third roller, and the synchronization control controls the speed of the third roller such that the actual speed value of the third roller matches the speed setpoint.

9. Road test simulator as claimed in claim 8, further comprising:
   a detector detecting an actual speed value of a fourth of the rollers,
   wherein the detected actual speed value of the roller acting as the master is defined as a speed setpoint for at least one of speed and angle control of the fourth roller, and the synchronization control controls the speed of the fourth roller such that the actual speed value of the fourth roller matches the speed setpoint.

10. Road test simulator as claimed in claim 1, wherein the synchronization pulses are output from the rollers at least once per rotation.

11. Road test simulator as claimed in claim 10, wherein the control unit of a downstream one of the rollers is configured to receive both the synchronization pulse derived from one of the rollers located upstream in the ring structure and the synchronization pulse derived from the downstream roller associated with the control unit, and wherein the synchronization control counts the number of pulses of a tachometer occurring between these two synchronization pulses, and uses the count to adjust a desired offset between the two rollers.

12. A method, comprising:
   assigning a master function to a first of four rollers of a road test simulator,
   defining a speed setpoint for control of the roller acting as the master,
   detecting an actual speed value of the roller acting as the master,
   defining the detected actual speed value of the roller acting as the master as a speed setpoint for controlling a second of the four rollers,
   detecting an actual speed value of the second roller, and
   controlling the speed of the second roller to match the actual speed value of the second roller to the speed setpoint.

13. The method according to claim 12, further comprising:
   defining the detected actual speed value of the roller acting as the master as a speed setpoint for controlling a third of the four rollers,
   detecting an actual speed value of the third roller, and
   controlling the speed of the third roller to match the actual speed value of the third roller to the speed setpoint.

14. The method according to claim 13, further comprising:
   defining the detected actual speed value of the roller acting as the master as a speed setpoint for controlling a fourth of the four rollers,
   detecting an actual speed value of the fourth roller, and
   controlling the speed of the fourth roller to match the actual speed value of the fourth roller to the speed setpoint.

15. The method according to claim 12, further comprising:
   receiving a first synchronization pulse from the first roller and a second synchronization pulse from the second roller,
   detecting an offset between the first and second synchronization pulses, and
   utilizing the detected offset to adjust an offset between the first roller and the second roller.

16. The method according to claim 15, further comprising:
   receiving the second synchronization pulse from the second roller and a third synchronization pulse from the third roller,
   detecting an offset between the second and third synchronization pulses, and
   utilizing the detected offset to adjust an offset between the second roller and the third roller.

17. The method according to claim 16, further comprising:
   receiving the third synchronization pulse from the third roller and a fourth synchronization pulse from the fourth roller,
   detecting an offset between the third and fourth synchronization pulses, and
   utilizing the detected offset to adjust an offset between the third roller and the fourth roller.

* * * * *